United States Patent [19]

Capra

[11] 4,004,313
[45] Jan. 25, 1977

[54] SCRUBBING UNIT FOR VEHICLE-WASHING STATION

[75] Inventor: Uberto Capra, Alte Ceccato (Venice), Italy

[73] Assignee: Ceccato & C. S.p.A., Alte Ceccato (Venice), Italy

[22] Filed: Sept. 8, 1975

[21] Appl. No.: 611,254

[30] Foreign Application Priority Data

Sept. 10, 1974  Italy ................................ 27130/74

[52] U.S. Cl. .......................... 15/53 AB; 15/DIG. 2
[51] Int. Cl.² .......................................... B60S 3/06
[58] Field of Search .......... 15/DIG. 2, 53 A, 53 AB

[56] References Cited

UNITED STATES PATENTS 3,403,417  10/1968  Hanna et al. .................... 15/53 AB

FOREIGN PATENTS OR APPLICATIONS 1,280,073  10/1968  Germany ........................ 15/DIG. 2
1,945,741  3/1971   Germany ........................ 15/DIG. 2

*Primary Examiner*—Edward L. Roberts
*Attorney, Agent, or Firm*—Karl F. Ross; Herbert Dubno

[57] ABSTRACT

In order to prevent entanglement of the bristles of a rotating brush with outside mirrors or other projecting parts of an automotive vehicle being scrubbed, the brush is divided into a lower and an upper section coaxially supported on a common substantially vertical shaft, the lower section being fixed to the shaft whereas the upper one is freely rotatable thereon. Each brush section has a cylindrical core with a body of flexible bristles radiating therefrom; during rotation, the two bristle bodies assume the shape of cylinders with substantially equal diameters. A frictional coupling is externally operable, manually or through a cam track disposed alongside the path of movement of the brush support, for either linking the core of the upper section with the shaft or holding it against rotary entrainment, the latter state allowing the bristles of that section to collapse while the continuing rotation of the adjoining lower section holds the brush shaft spaced from the vehicular surface against which it is urged by an external force.

8 Claims, 3 Drawing Figures

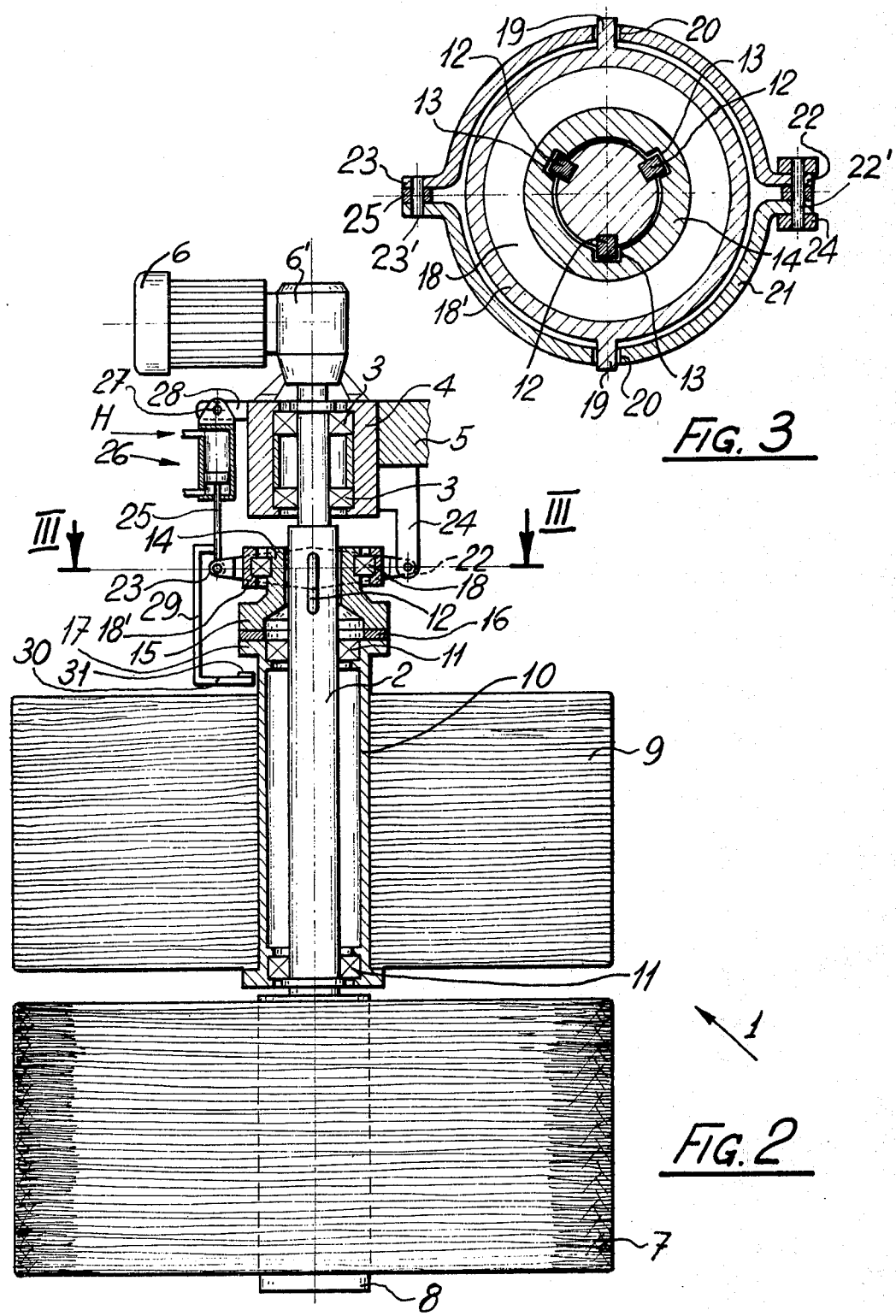

SCRUBBING UNIT FOR VEHICLE-WASHING STATION

FIELD OF THE INVENTION

My present invention relates to a scrubbing unit for a vehicle-washing station having one or more brushes rotatable about generally vertical axes to sweep and cleanse the lateral and/or transverse surfaces of an automotive or other vehicle moving relatively thereto.

BACKGROUND OF THE INVENTION

Passenger cars and other vehicles are frequently provided with outward projections extending into the path of the rotating brushes. These include, for example, nonretractable radio antennas, external rear-view mirrors and raised nameplates or other ornamentations. The bristles of a scrubbing brush, especially if sufficiently flexible to hang down from the brush core in the motionless state and to radiate outwardly from that core only during rotation, are liable to become entangled in such structure and to damage same or be damaged by it. The expedient of simply stopping the rotation of the brush as it moves past the obstacle is unsatisfactory since the cessation of the centrifugal force causes the collapse of the bristles and exposes the vehicular surface to impact from the metallic brush core which is being urged toward that surface by its control mechanism. Withdrawing the brush from the vehicular surface in the area of such an obstacle, on the other hand, requires complicated modifications of that control mechanism and, furthermore, prevents the scrubbing of an entire vertical zone adjoining the projection whose avoidance by the brush is intended.

OBJECTS OF THE INVENTION

The general object of my present invention, therefore, is to provide an improved scrubbing unit obviating the aforestated inconvenience.

A more particular object is to provide means in such a scrubbing unit for enabling the continuous sweeping of a vehicular surface at a level free from projections along with intermittent sweeping of the surface at a level where such projections are present.

SUMMARY OF THE INVENTION

A scrubbing unit according to my present invention is divided into a first and a second brush section carried next to each other on a generally vertical shaft which is journaled in a support, each brush section having a core provided with a set of flexible bristles forming a substantially cylindrical body during rotation; the diameters of these bodies are substantially identical. The core of the first brush section, usually the lower one (since the projections here considered are normally disposed at an elevated level), is rigid with the shaft whereas the core of the second brush section is freely rotatable thereon. The latter core can be selectively linked with the shaft, for rotary entrainment thereby, with the aid of coupling means under the control of manual or automatic operating means.

In such a scrubbing unit, deactivation of the second (usually higher) brush section will obviate interference of its bristles with surface projections in its path but will prevent the core of that brush from coming into contact with these projections, or with the vehicular surface itself, on account of the continuing rotation of the first brush section which holds the common brush shaft spaced from that surface. Advantageously, for this purpose, the two brush sections are mounted immediately one above the other.

Since the closeness of the two brush sections may result in continuing rotary entrainment of the deactivated second section by the bristles of the first one, I prefer to provide the externally operable coupling means with a brake mechanism for positively arresting the second brush section in its deactivated condition. Frictional, electromagnetic or other brakes may be used for this purpose; in a simple and therefore particularly advantageous mode of realization, the core of the second brush section is provided with an annular flange alternately engageable by a drive member keyed to the brush shaft and by a brake shoe on an extension of the drive member. Displacement of that member, and of the associated brake shoe, can be controlled fluidically, electrically, or purely mechanically. Manual control can be carried out with a simple switch, e.g. in the form of a pushbutton, whereas automatic control (in the event of a brush support movable past a stationary vehicle) can be effected with the aid of switch-closing cams disposed along the path of displacement.

BRIEF DESCRIPTION OF THE DRAWING

The above and other features of my invention will now be described in detail with reference to the accompanying drawing in which:

FIG. 2 is a view similar to FIG. 1, showing some of its parts in axial section and illustrating the unit in its fully operative condition; and FIG. 3 is a cross-sectional view taken on the line III—III of FIG. 2.

SPECIFIC DESCRIPTION

Figure 1:
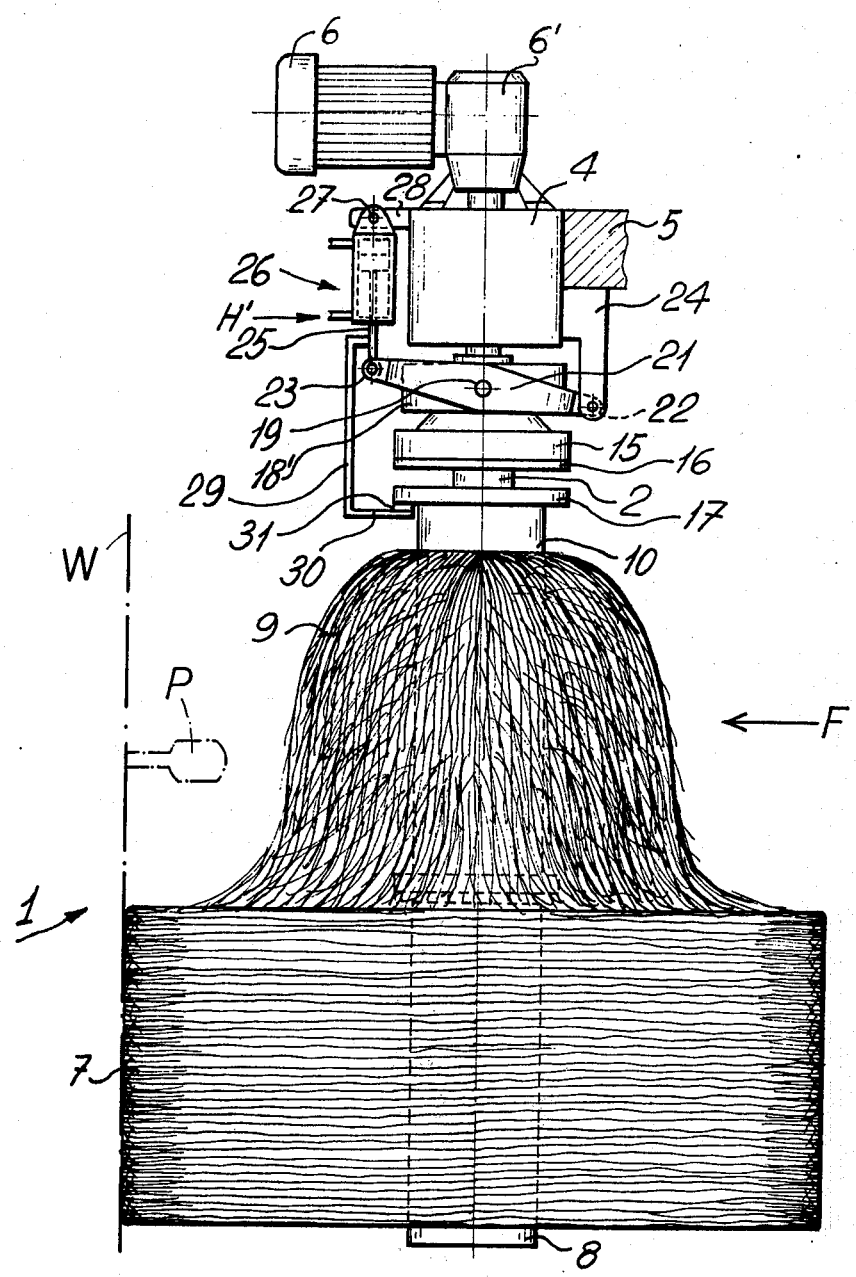
FIG. 1 is an elevational view of a scrubbing unit according to my invention, shown in a collapsed state of one of its brush sections.

In the drawing, generally designated 1, have shown a scrubbing unit 1 mounted on a support 5 which has been illustrated only in part. This support is connected with a fixed or mobile structure, such as a tunnel wall alongside a guide track for a vehicle to be washed or a portal frame straddling a vehicle while moving longitudinally thereof. More particularly, support 5 could be a horizontally swingable arm, e.g. as shown in my copending application Ser. No. 511,183 filed Oct. 2, 1974, now U.S. Pat. No. 3,931,660 or extend from a carriage transversely reciprocable on the structure as is well known per se. In either case, part 5 is subjected to a force F urging it toward a wall surface W of a vehicle not further illustrated.

The scrubbing unit 1 comprises a more or less vertical shaft 2 journaled by means of ball or roller bearings 3 in a sleeve 4 which is fixedly held in support 5. A motor 6 with reduction gearing 6' serves for the continuous rotation of shaft 2 during a washing cycle. A lower brush section 7, comprising a body of flexible bristles on a cylindrical core 8, and an upper brush section 9, with a similar body of bristles on a cylindrical core 10, are held in axially fixed relationship on the shaft 2; core 8 is rigid with that shaft whereas core 10 is freely rotatable thereon through the intermediary of ball or roller bearings 11.

Shaft 2 is provided, above brush section 9, with a plurality of angularly spaced keys 12 received in keyways 13 of a collar 14 which is thus nonrotatably but axially slidably secured to the shaft. The lower part 15 of collar 14 forms a flat annular shoulder confronting an annular flange 17 of brush core 10, this shoulder carrying a brake lining 16 engageable with the flange 17 as illustrated in FIG. 2. Such engagement, which results in the frictional entrainment of brush section 9 by shaft 2 in unison with brush section 7, is brought about by a coupling mechanism including a yoke-shaped lever 21 which embraces an outer race 18' of a ball or roller bearing 18 whose inner race is constituted by the upper part of collar 14. Race 18' has two diametrically opposite pivot pins 19 traversing holes 20 in lever 21, the latter being thus swingable about a horizontal axis perpendicular to the axis of rotation of shaft 2. An extremity 22 of lever 21 is fixedly fulcrumed by a pin 22', with the necessary play, to the lower end of a bracket 24 rigid with support 5. The opposite lever end 23 is articulated by a pin 23', again with the required play, to a piston rod 25 whose piston head is received in a double-acting pneumatic cylinder 26 which is hinged at 27 to a lug 28 rigid with sleeve 4. An L-shaped downward extension of rod 25 (and therefore also of yoke 21 and member 14, 15), with a long vertical leg 29 and a short horizontal leg 30, carries a brake shoe 31 at the end of its short leg, this shoe being engageable with the underside of flange 17 to arrest the brush section 9 in the position of FIG. 1 in which the brake lining 16 on member 14, 15 is disengaged from that flange.

If pressure fluid is admitted into an upper port of cylinder 26, as indicated by an arrow H in FIG. 2, collar 14 is lowered to drive the upper brush section 9 which thus sweeps the adjoining vehicular wall surface W jointly with lower brush section 7; as is apparent from FIG. 2, the bristles of the two rotating brush section form two closely spaced cylindrical bodies of like diameter adapted to scrub adjoining zones of wall surface W. Contact with that surface, of course, somewhat flattens these cylindrical bodies and broadens the area of engagement. The entire unit 1 could also be oscillatable about an elevated horizontal axis to swing in a plane perpendicular to the wall surface W so as to accommodate slightly sloping surface portions of the vehicle.

If, during normal operation, a projection P (FIG. 1) on surface W is encountered by the relatively moving scrubbing unit, brush section 9 is deactivated by the pressurization of the lower port of cylinder 26 as indicated by an arrow H' in FIG. 1. The resulting rise of collar 14 decouples the flange 17 from brake lining 16 but brings the brake shoe 31 into frictional engagement with that flange whereby brush section 9 is arrested, its bristles collapse as shown in FIG. 1, and the projection P is cleared by the advancing scrubbing unit whose lower brush section 7 continues to do its work. After projection P has been passed, the pressure in cylinder 26 is again reversed (arrow H) and the normal working condition of FIG. 2 is restored.

The admission of pressure fluid to one or the other cylinder port can be manually controlled, particularly if the structure carrying the support 5 is stationary, or can be brought about by a nonillustrated switch on a wheeled base of that structure coacting with camming formations adjustably disposed along an associated guide rail, e.g. in the region of an outside mirror on the vehicle.

Naturally, the double-acting cylinder 26 could also be replaced by a single-acting one in which a spring normally holds the piston rod 25 in one of its two illustrated positions, preferably the working position of FIG. 2. It will also be evident that the brake carrier 29, 30 could be secured directly to the bearing race 18' and that, if desired, a more positive-acting detent could be substituted for the brake shoe 31. Moreover, the illustrated frictional coupling may be replaced by an electromagnetic clutch-and-brake assembly of conventional type.

I claim:

1. A vehicle-washing station provided with a support and at least one scrubbing unit engageable with an upright surface of a vehicle moving relatively to said support, said scrubbing unit comprising:

a generally vertical shaft journaled in said support;

drive means for rotating said shaft;

a lower and an upper brush section carried next to each other on said shaft, each of said brush sections having a core provided with a set of flexible bristles forming a substantially cylindrical body during rotation, the bodies of said brush sections being of substantially like diameters, the core of said lower brush section being rigid with said shaft, the core of said upper brush section being freely rotatable on said shaft;

operating means for selectively coupling said upper brush section with said shaft; and an axially slidable member keyed to said shaft above said upper brush section and displaceable by said operating means between an idling position and a driving position, the core of said upper brush section having a formation engageable by said member in said driving position, said member being provided with an extension terminating in a brake shoe engageable with said formation for arresting said upper brush section in said idling position.

2. A vehicle-washing station as defined in claim 1 wherein said formation comprises an annular flange having an upper surface frictionally engageable by said member and a lower flange frictionally engageable by said brake shoe.

3. A vehicle-washing station as defined in claim 1 wherein said member forms an inner race for an antifriction bearing having a stationary outer race linked with said coupling means.

4. A vehicle-washing station as defined in claim 1 wherein said extension includes a lever having a fixed fulcrum on said support, a pivotal connection with said outer race and an articulated junction with said operating means.

5. A vehicle-washing station as defined in claim 4 wherein said operating means includes a fluid-pressure cylinder having a piston joined to said lever.

6. A vehicle-washing station provided with a support and at least one scrubbing unit engageable with an upright surface of a vehicle moving relatively to said support, said scrubbing unit comprising:

a generally vertical shaft journaled in said support;

drive means for rotating said shaft;

a lower and an upper brush section carried next to each other on said shaft, each of said brush sections having a core provided with a set of flexible bristles forming a substantially cylindrical body during rotation, the bodies of said brush sections being of substantially like diameters, the core of said lower brush section being rigid with said shaft, the core of said upper brush section being freely rotatable on said shaft;

operating means for selectively coupling said upper brush section with said shaft; and an axially slidable member keyed to said shaft by said upper brush section and displaceable by said operating means between an idling position and a driving position, the core of said upper brush section having a formation engageable by said member in said driving position, said member forming an inner race for an anti-friction bearing having a stationary outer race linked with said operating means.

7. A vehicle-washing station as defined in claim 6, further comprising a lever articulated to said operating means, said lever having a fixed fulcrum on said support and a pivotal connection with said outer race.

8. A vehicle-washing station as defined in claim 7 wherein said lever has the shape of a yoke embracing said outer race, said pivotal connection comprising a pair of diametrically opposite pivots.

* * * * *